Sept. 18, 1945.   L. S. WILLIAMS   2,385,323
SENSING MECHANISM
Filed Dec. 18, 1942   5 Sheets-Sheet 1
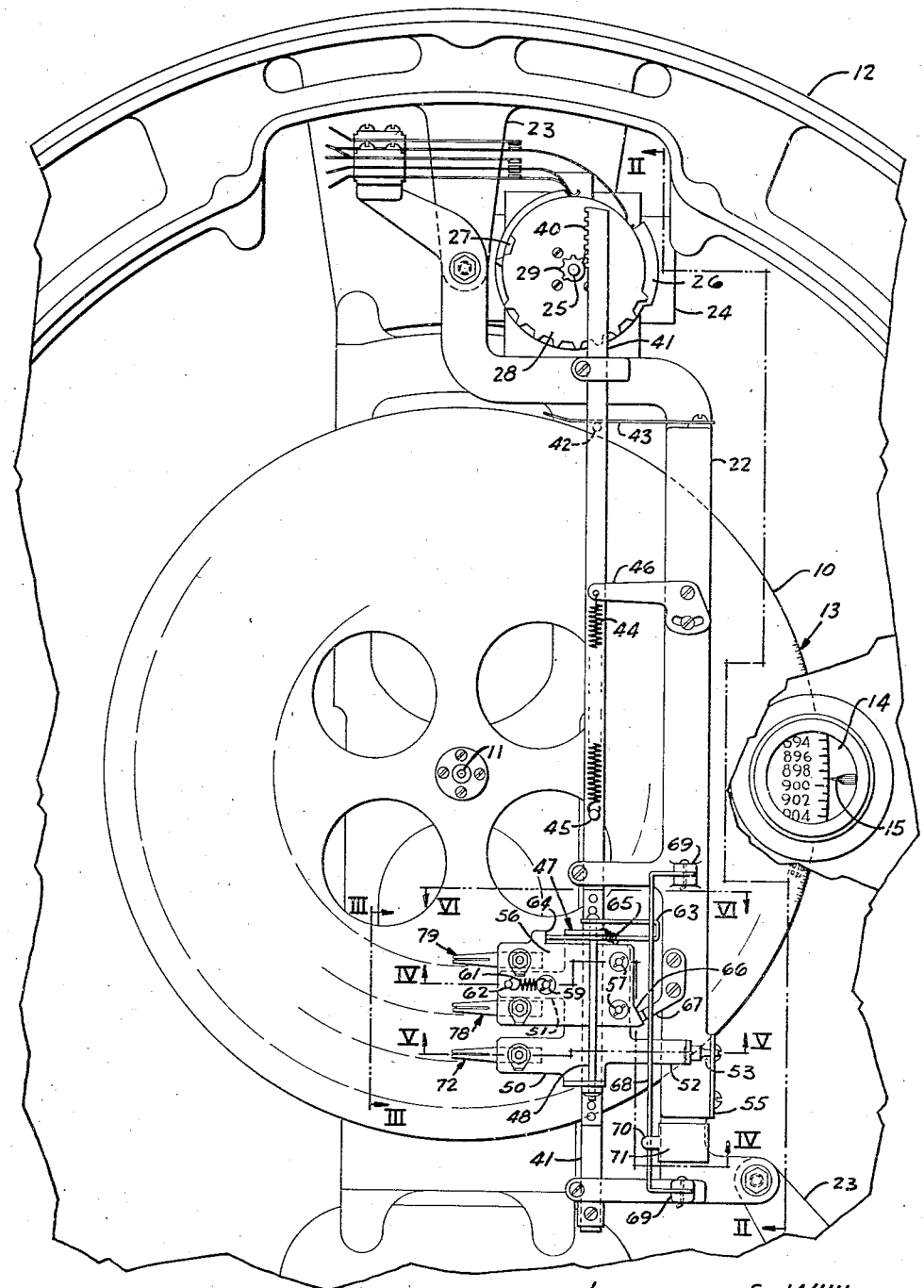
Fig. I
Lawrence S. Williams
INVENTOR.
BY Marshall & Marshall
ATTORNEYS

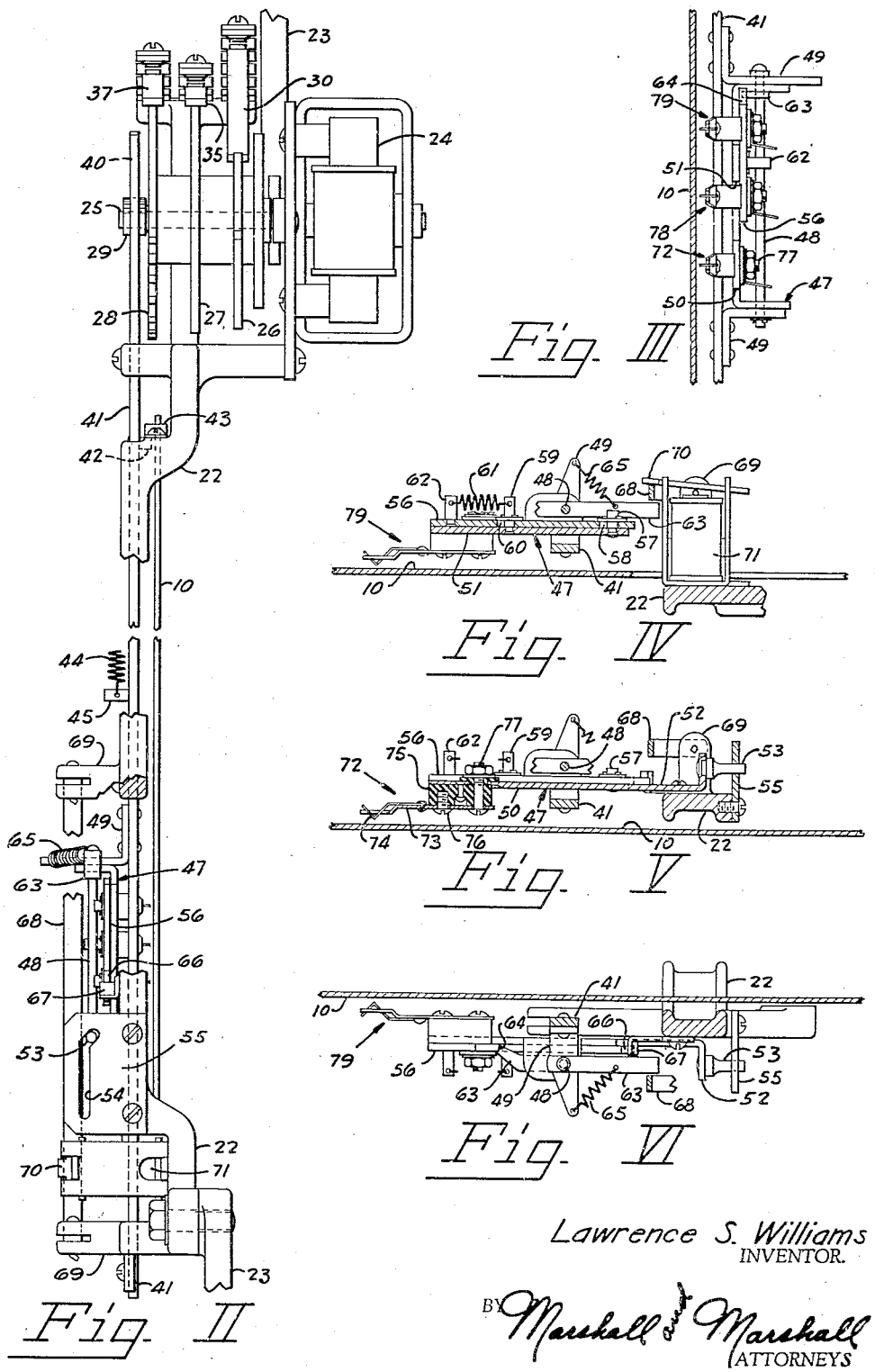

Sept. 18, 1945.　　　L. S. WILLIAMS　　　2,385,323
SENSING MECHANISM
Filed Dec. 18, 1942　　　5 Sheets-Sheet 3
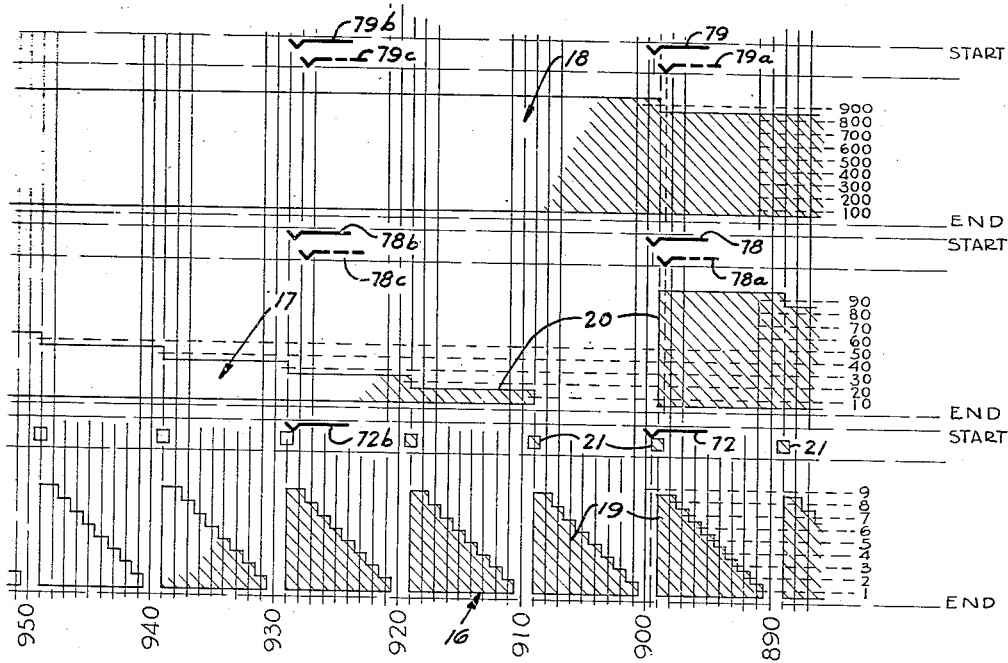
Fig. VIII
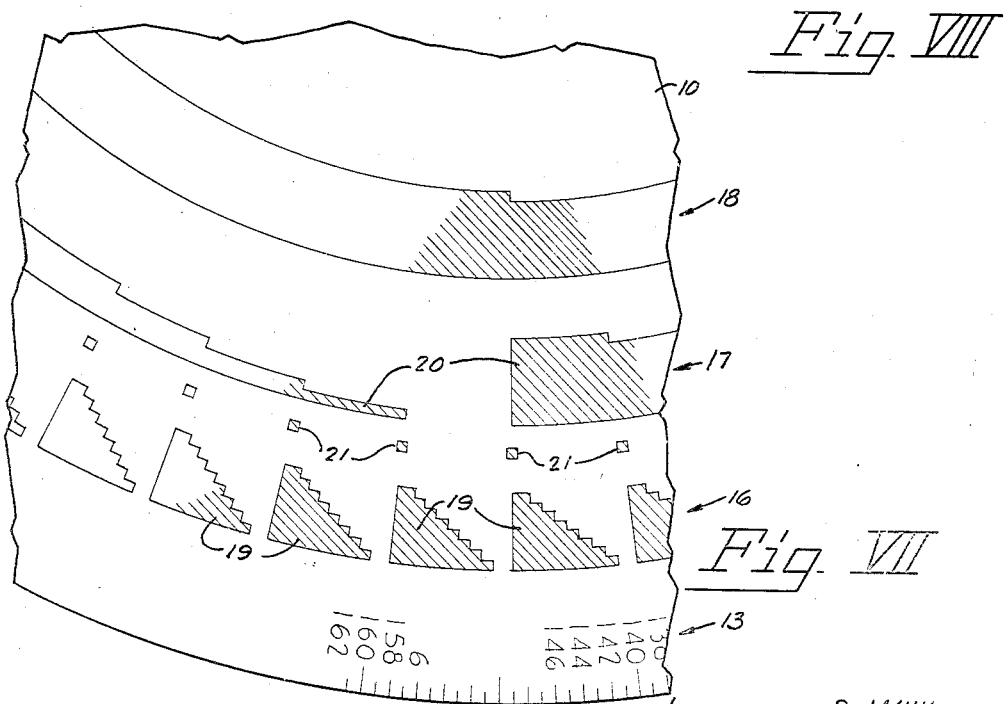
Fig. VII
Lawrence S. Williams
INVENTOR.
BY Marshall & Marshall
ATTORNEYS Sept. 18, 1945. L. S. WILLIAMS 2,385,323
SENSING MECHANISM
Filed Dec. 18, 1942 5 Sheets-Sheet 4
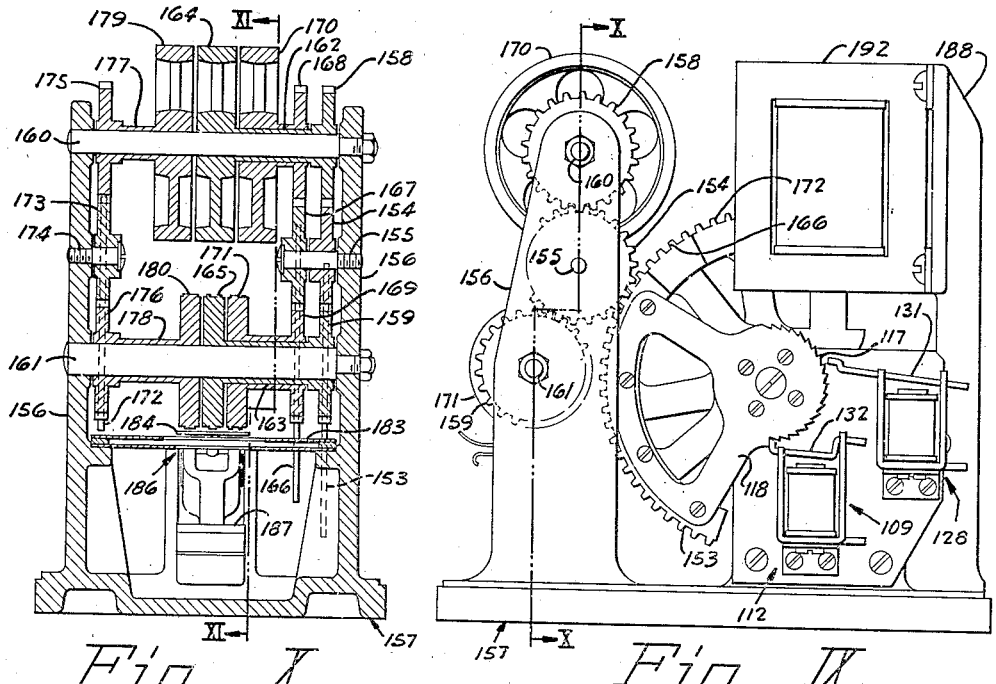
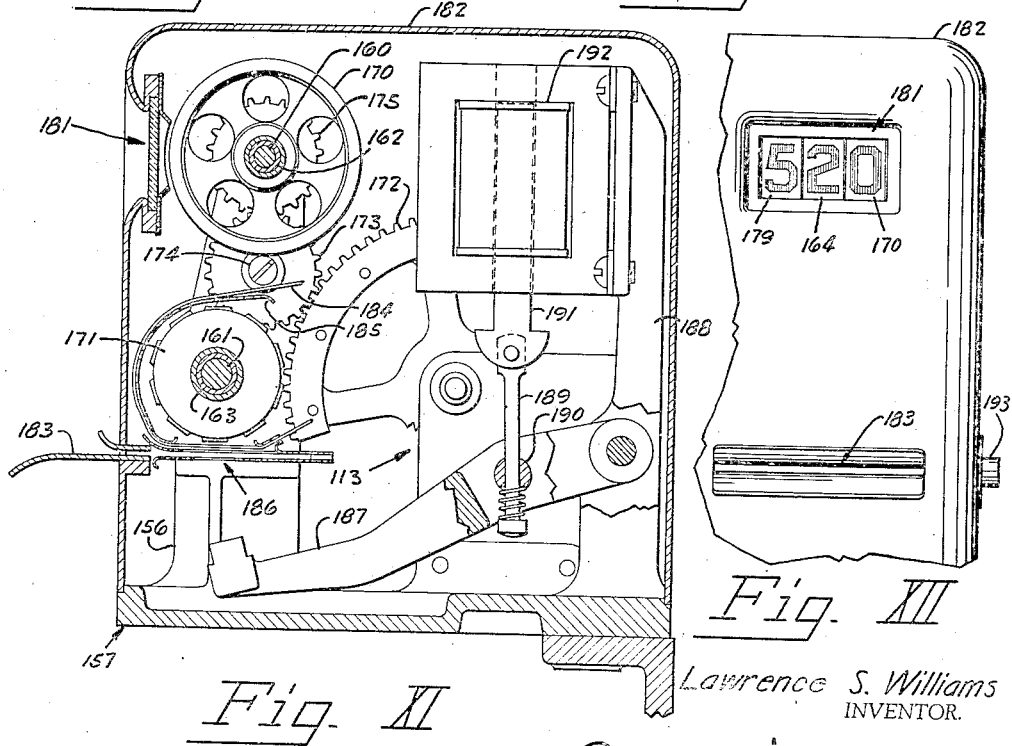
Lawrence S. Williams
INVENTOR.
BY Marshall & Marshall
ATTORNEYS

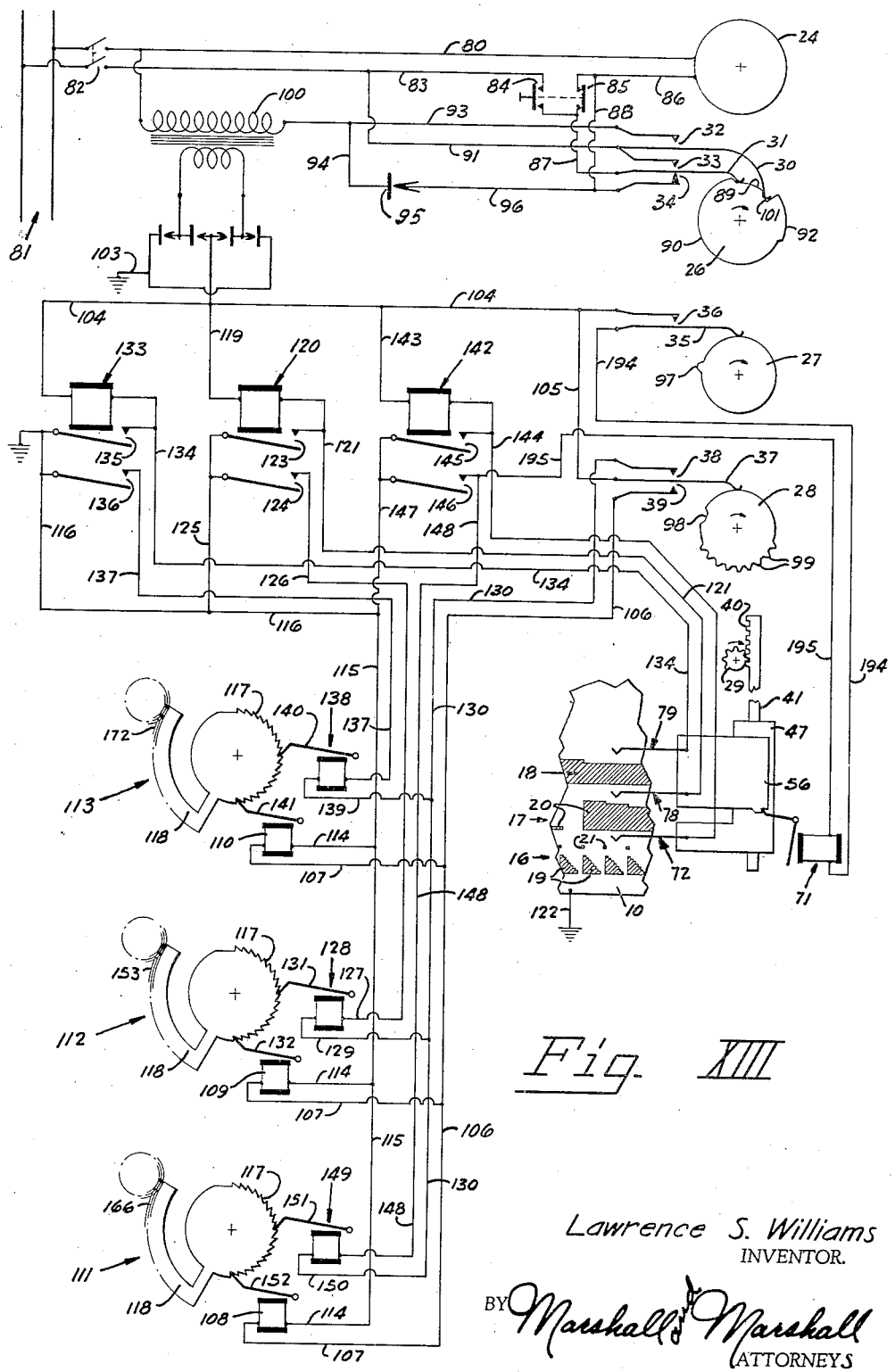

Patented Sept. 18, 1945

2,385,323

UNITED STATES PATENT OFFICE 2,385,323

SENSING MECHANISM

Lawrence S. Williams, Toledo, Ohio, assignor to Toledo Scale Company, Toledo, Ohio, a corporation of New Jersey Application December 18, 1942, Serial No. 469,427

14 Claims. (Cl. 177—351)

This invention relates to sensing mechanisms for sensing the rest position of condition-responsive elements of condition-responsive instruments or for sensing selected value-representing designations moved into sensing position by some other means; and for operating auxiliary mechanisms for indicating, printing or accumulating the values corresponding to such rest position or such designations.

The invention is susceptible to use in sensing not only the position of movable elements but also to use in reading values from designation bearing media, such as tabulating cards, automatic machine controlling elements, etc. For purposes of illustration, the invention is herein described as used to sense the position of a load-responsive member of a weighing scale.

Because of the high leverage which exists between the load-receiving and load-responsive members of a weighing scale, and the resulting fact that the condition-responsive element must be as free of mass and friction as possible, it is impossible to drive devices such as counters, or printers which carry large type, directly from the load-responsive member of a scale. This requirement also is true with respect to other sensitive instruments. Consequently when it is desired either to print the weight indicia or to provide a remote indication, it has usually been proposed to employ one of two general types of mechanisms. The first of these is the so-called "follower" mechanism which is moved by an auxiliary source of power to the position assumed by the load-responsive member of the weighing scale (or other instrument or device), the auxiliary source of power also serving to move auxiliary mechanisms to corresponding positions. None of the many mechanisms of this type which have been developed have proved to be commercially satisfactory.

The second attempted solution to the problem has been to provide a sensing mechanism which senses the position of the load-responsive member of the scale and then translates such sensed position into movement of an auxiliary mechanism.

A fundamental problem encountered in the construction of sensing mechanisms arises from the fact that, whatever form of differentiation between successive increment positions of the load-responsive element is employed, there is always a "critical position" between the designations or steps representing two successive increments. If the sensing mechanism, regardless of its particular type, comes into contact with the load-responsive element at the point dividing one increment designation from the successive increment designation, it may select either one or the other. For example, if the load actually weighed on the scale is 499 increments so that the hundreds sensing device would have to select the "4" designation rather than the "5" designation, it might select the higher of the two, causing the mechanism to register 599 rather than 499.

Some sensing mechanisms have been designed for use with load-responsive elements carrying a plurality of electrical contacts so arranged as to agree with the value of the loads and across which contact-makers may be moved, the indicating or printing mechanisms being set up by the impulses created as the contact-makers close the particular contacts. In mechanisms of this type where so-called impulse counters are employed, an element of time enters in, because, while electrical contacts can be made at extremely high speeds and electrical solenoids for operating the counting mechanisms can be energized very rapidly, if the times for breaking contacts and de-energizing solenoids are much longer. In these mechanisms it requires a rather lengthy period of time after the weighing mechanism comes to rest before the sensing mechanism completes its operation and sets up the sensed values. Many of such electrical mechanisms require an extremely high number of electrical contacts and electrical connections, thus rendering them impracticable. Furthermore, when a remote indication is required, a large number of electrical connections necessitates a very cumbersome cable for connecting the sensing mechanism to the indicating mechanism.

It is an object of this invention to provide a sensing mechanism for sensing the position to which a condition-responsive element is moved which is not liable to error due to the sensing of incorrect values at "critical positions."

It is another object of this invention to provide a value sensing device comprising a plurality of "feelers" movable into contact with an equal number of series of stepped contacts, which, when the value to be sensed is "critical," bodily shifts the higher value feelers to prevent erroneous sensing of incorrect higher values.

It is another object of this invention to provide an electrically operated sensing mechanism for sensing the position of a condition-responsive element, the time of operation of which is not dependent upon the length of time required to break the series of electrical contacts.

It is a further object of this invention to provide an electrical sensing means for sensing the position of a condition-responsive element by drawing a plurality of contact-makers across electrical contacts arranged in groups in series, there being a series corresponding to each digit value in the indications to be afforded, in which the phenomenon of arcing is practically eliminated and thus the life of the device is proportionately lengthened.

It is a further object of this invention to provide an electrical means for sensing the position of the condition-responsive element of a measuring instrument which is rapid in operation, is not liable to destruction from electrical arcing and can be used to operate remote indicating means while requiring only a very few electrical connections between the remote indicating means and the sensing mechanism.

It is a further object of this invention to provide an electrical tracing device in which tracers are movable across stepped contacts and in which those tracers at the "critical positions" are shifted bodily to prevent erroneous tracing of contacts corresponding to incorrect values.

It is a further object of this invention to provide a sensing device in which impulses to be counted in accordance with the value to be sensed are regularly created and are registered in counters corresponding to various increments of the total value only upon engagement of corresponding elements of the sensing device.

More specific objects and advantages are apparent from the description, in which reference is had to the accompanying drawings illustrating a preferred form of scale embodying the invention.

In the drawings:

Fig. I is a fragmentary view, in elevation, of a condition-responsive member and tracing equipment cooperating therewith.

Fig. II is a fragmentary view, in elevation, taken substantially from the position indicated by the line II—II of Fig. I.

Fig. III is a fragmentary view, in elevation, on an enlarged scale, taken from the position indicated by the line III—III of Fig. I.

Fig. IV is a horizontal sectional view, taken substantially on the line IV—IV of Fig. I.

Fig. V is a similar view, taken substantially on the line V—V of Fig. I.

Fig. VI is a similar view, taken substantially on the line VI—VI of Fig. I.

Fig. VII is a view, on a greatly enlarged scale, of a fragment of the condition-responsive element and the calibrations borne thereby.

Fig. VIII is a straight line projection of the fragment shown in Fig. VII diagrammatically illustrating the timing and operation of the sensing mechanism shown in Fig. I.

Fig. IX is a view, in elevation, of indicating and printing mechanism operable in response to the sensing performed by the mechanism shown in Fig. I.

Fig. X is a vertical sectional view, taken substantially on the line X—X of Fig. IX.

Fig. XI is a vertical sectional view, taken substantially on the line XI—XI of Fig. X and showing a housing over the mechanism.

Fig. XII is a fragmentary view, in elevation, taken from the left side of Fig. XI.

Fig. XIII is a schematic wiring diagram of the electrical and associated mechanism employed in the operation of the device illustrated in Fig. I.

These specific drawings and the specific description that follows merely disclose and illustrate the invention and are not intended to impose limitations upon the claims.

A condition-responsive disk 10 which is rotated proportionately to the operation of a weighing (or other) instrument is mounted on a shaft 11 located inside a housing 12 of the instrument. The disk 10 is responsive directly in proportion to the magnitude of the condition under measurement and bears a series of visible indicia 13 near its periphery which can be viewed through a magnifying lens 14, set in the outside wall of the housing 12, in cooperation with a stationary index 15 to indicate the magnitude of the condition under measurement.

The surface of the disk 10, in addition to bearing the visible indicia 13, also carries a plurality of series of calibrations or increment designating elements, comprising contacts 16, 17 and 18, one of such series being provided for each digit in the desired indications (for example, on the chart shown in Fig. VII the series 16 corresponds to unit increments of value, the series 17 to tens and the series 18 to hundreds).

The circumferential length of the disk 10 in radians is divided by the total number of the smallest increments of value which it is desired should be indicated, in this case 1000 parts. The series of calibrations 16 is thus made up of a plurality of successive spaced contacts 19, each of which represents ten increments, each increment having a value of one. Each one of the successive steps in the contacts 19 stretches circumferentially a distance exactly equal to the distance through which the disk 10 is moved in response to one increment of weight.

The series of stepped contacts 17 is similarly constructed comprising a plurality of circumferentially elongated contacts 20, each of which has a plurality of steps, each step stretching circumferentially a distance equal to the distance through which the disk 10 is moved in response to a change in condition equal to ten increments of value. Similarly, there is provided a single hundreds contact 18 having successive steps, each step of which extends circumferentially a distance equal to the distance through which the disk 10 is moved in response to a change in condition of one hundred increments of value. It should be noted in Fig. VII that the radial thickness of each of the steps in the contacts 19, 20 and 18 is equal and that the "risers" between the steps which form demarcations between the successive increment designations, are all drawn along radii of the disk. Each of the unit steps in the units contacts 19 is bisected circumferentially by that radius of the disk to which it corresponds. In other words, each step extends one-half the distance between the value it represents and the next higher and next lower values.

The last step in each of the contacts 19 is an exception to the rule. This step (having a value of "8") extends from the position corresponding to "7½" to the position corresponding to "9." The left side of each of the contacts 19 lies along a radius corresponding to the "9" value. Associated with each of the units contacts 19 is a contact 21 which extends from "8½" to "9½" circumferentially and is spaced, radially, a short distance from its associated contact 19. Each of the contacts 21 corresponds to a value of "9." The contacts 21, although spaced from their corresponding contacts 19, are actually a part of such contacts and could just as well be integral therewith, as long as they extended toward the center of the disk 10 as far as shown.

The mechanism for sensing the position of the disk 10 and examining the increment designating elements borne thereby is all mounted on a bracket 22 which in turn is mounted on two posts 23 in the interior of the housing 12 and lies substantially in a plane parallel to the plane of the disk 10. At the upper end of the bracket 22 there is mounted a small electric motor 24, which, in the embodiment shown, is of the "shaded-pole" type. The motor 24 drives a shaft 25 (Fig. II) on which are secured three cams 26, 27 and 28, and an intermittent gear 29. The periphery of the cam 26 is engaged by two cam riders 30 and 31 (see also Fig. XIII) which serve to control contacts 32 and the pair of contacts 33 and 34 respectively. The periphery of the cam 27 is engaged by a cam rider 35 which controls a contact 36 and the periphery of the cam 28 is engaged by a cam rider 37 which controls a pair of contacts 38 and 39.

The intermittent gear 29 is engageable in a short rack 40, cut in the upper end of a vertical slidable tracer bar 41 mounted in clips on arms of the bracket 22. A pin 42, riveted to and projecting rearwardly from the bar 41, is engageable beneath a spring brake 43, the right end of which is secured to the bracket 22 and the free end of which is engageable with the periphery of the disk 10 when the pin 42 is moved out of engagement with the brake. A spring 44 is hooked between a pin 45, riveted in the bar 41, and an adjustably positionable finger 46 secured to the bracket 22, the spring tending to urge the bar 41 toward and hold it at the upper limit of its travel.

A substantially U shaped tracer frame 47 (see also Fig. II) is mounted on a vertical pintle 48 which extends between two right angle clips 49 riveted on the bar 41. The cross bar of the tracer frame 47 is irregular in shape, having two arms 50 and 51 extending from its front side and an arm 52 extending from its rear side. The rearmost end of the arm 52 is turned up and carries a pin 53 which is riveted thereto. The pin 53 extends through a slot 54 cut in a guide 55 secured to the frame 22.

When the motor 24 is energized, the intermittent gear 29 is rotated in a clockwise direction driving the bar 41 downwardly and thus moving the pin 53 along the slot 54 which is so cut as to tilt the tracer frame 47 on its pintle, swinging the arms 50 and 51 toward the surface of the disk 10.

A tracer slide 56 overlies a portion of the tracer frame 47 being slidable transversely there across and is guided by two pins 57 which are riveted to the frame 47 and extend through elongated holes 58 in the slide 56, and a pin 59 riveted to the arm 51 of the tracer frame and extending through a similar hole 60 in the slide 56. A spring 61 is hooked between the upper end of the pin 59 and a pin 62 riveted to and extending upwardly from the slide 56, thus tending to pull the slide to the right. The slide is normally held to the left by the engagement of a U shaped latch 63, pivotally mounted on the pintle 48 at the upper end of the frame 47, with an ear 64 extending from the side of the slide 56. The latch is normally held in engagement with the ear 64 by a spring 65 hooked between it and the upper one of the angle clips 49. The rear edge of the slide 56 is cut to form a cam 66 which is engageable, when the sliding bar 41 is in its uppermost position, with a projection 67 secured to the bracket 22. The projection 67, when the bar 41 and the tracer frame and slide 56 move upwardly, restores the slide 56 to its left position.

The rear end of the latch 63 is engaged by a U shaped bar 68 pivoted in two ears 69 of the bracket 22. The bar 68 may be swung downwardly by a clapper 70 of a clapper solenoid 71. When the clapper solenoid 71 is energized, the clapper 70 swings the bar 68 which pushes on the rear of the latch 63, swinging the latch 63 to remove it from engagement with the ear 64 of the slide 56 to permit the slide 56 to move to the right. (This, of course, can occur only when the bar 41 and tracer frame and slide are not at the top of their stroke and the cam 66 is out of engagement with the projection 67.) As the slidable members are returned to the uppermost limit of their stroke by the spring 44, the projection 67, by engagement with the cam 66, returns the slide 56 to its left position and the spring 65 swings the latch 63 in behind the ear 64 of the slide 56.

A units tracer 72 (Fig. V), which comprises a bar 73 and a resilient contact 74 soldered thereto, is mounted on the left end of the arm 50 of the tracer frame 47. The bar 73 is insulated from the arm by a small block of non-conducting material 75 riveted to the underside of the arm 50 and is secured to the arm by a screw 76 and contact bolt 77 which also is insulated from the tracer arm 50.

A pair of tracer members 78 and 79 (corresponding respectively to tens and hundreds) is mounted on the undersurface of the tracer slide 56 in a manner similar to that in which the tracer 72 is mounted on the tracer frame arm 50. If the device were constructed to indicate additional digits values, for example, for tens of thousands there would be one additional tracer mounted on the slide 56, etc., one tracer being added for each additional digit.

When the bar 41 and tracer frame are moved downwardly, the pin 53, which runs in the slot 54, swings the tracer frame 47 on its pintle (as above explained) and swings the tracers 72, 78 and 79 into contact with the surface of the disk 10. As the bar and tracer frame continue to move downwardly, the three tracers are drawn across the respective series of contacts 16, 17 and 18. When the intermittent gear 29 has rotated far enough so that its teeth have all passed the rack teeth 40, the bar 41 is released upwardly under impetus of the spring 44. This slides the tracers upwardly across their respective contacts and, just before the upper limit of the stroke is reached, the pin 53 is swung by the slot 54 to raise the tracers from the surface of the disk.

In Fig. XIII there is shown a wiring diagram for the operation of the mechanism just described. The motor 24 is wired for single cycle operation. A lead 80 connects one side of the motor to one side of a main power source 81 through a master switch 82. The other side of the line is connected through a lead 83 to normally open contacts 84 of a push button switch, the other side of the contacts 84 being connected to one side of normally closed contacts 85 of the push button switch. The other side of the contacts 85 is connected through a lead 86 to the other side of the motor 24. When the push button switch contacts 84 are closed, current flows from the line through the lead 83, the contacts 84, a lead 87, the now closed contact 34 and a lead 88 to the lead 86 to the motor 24 and through the lead 80 to the other side of the line. The motor starts to rotate and the cam rider 31 climbs up from a lower surface 89 which it contacts when the device is at rest onto a higher surface 90 of the cam 26. This closes the contact 33. The push button switch now can be released and current flows from the line through the lead 83, a lead 91, the contact 33, the lead 87 and the contacts 85 of the push button, which are closed when the push button is released, to the motor and the opposite side of the line. The motor continues to rotate. The next step in the operation which normally occurs is when the rider 30 rides up on a high cam surface 92 of the cam 26. This closes the contact 32. Shortly thereafter the rider 31 drops off the high surface 92 of the cam 26, opening the contact 33. Current can no longer flow through the circuit above described, which this contact controls, and, therefore, current is shunted around the contact 33 flowing from the line through the lead 83, the lead 91, the contact 32, a lead 93, a lead 94, a half-wave rectifier 95, a lead 96 and the lead 88 to the lead 86 and then to the motor and the lead 80 to the opposite side of the line. The half-wave rectified current when applied to the "shaded-pole" motor causes the motor to slow down and to creep very slowly but with high torque. This counteracts almost all of the momentum which the parts may have. The motor continues to revolve slowly finishing the cycle of operation until the rider 30 drops off the surface 92 which breaks the circuit just described and brings the motor to a stop.

It is desirable that only single cycle operations be permitted but, if the push button contacts 84 were held closed instead of being released as soon as the cycle starts, current could flow through the contact 34 and thus maintain the motor at high speed so that it might be carried by momentum far enough for the contact 33 again to close instituting a second cycle. This is prevented by the fact that when the rider 31 rides up on the high level surface 92, it breaks the contact 34. If the push button has been held in, its contacts 85 are open and thus current cannot flow through them and the contact 33, which is closed, to energize the motor (as would normally occur). At this point, therefore, since the contact 32 is closed, the current must pass through the half-wave rectifier, thus slowing down the motor. This signals the operator to release the push button, in which case the operation proceeds as above described. The operation of the mechanism just described constitutes a single cycle control which assures only one cycle of operation of the device upon the closing of the actuating push button contacts 84, but is not, per se, a part of the instant invention. Any single cycle mechanism may be employed for rotating the cams 26, 27 and 28 and the gear 29.

At the same time that the cam 26 is rotated, the cams 27 and 28 and the intermittent gear 29 are also rotated since they are secured on the same shaft. The cam 27 has a single short high surface 97, and the cam 28 has a single low surface 98 and nine short equally spaced high surfaces 99. The timing relation between each of the steps of a cycle of operation is controlled by the relationship between the various surfaces on the cams 27 and 28 and the teeth on the intermittent gear 29.

The current for operating the counting and tracing mechanism is derived from a transformer 100, the energization of which is controlled by the contact 32 above described so that all electrical circuits are cut off at the same time. The cam rider 30 has a "home" position on a low surface 101 of the cam 26 which is lower than the surface 89. The contact 32 is open only when the rider 30 is in this "home" position. Thus, as soon as the motor is energized, and the cam 26 starts to rotate, the rider 30 climbs on the surface 89 and successively on the surfaces 90 and 92, maintaining the contact 32 closed throughout the entire cycle of operations. Thus the two electrical circuits (one motor operating and the other tracer and counter operating) are simultaneously energized and de-energized. The secondary coil of the transformer 100 is connected to a full-wave rectifier 102 which is a source of direct current required for operating the tracing circuits.

The steps in a cycle of tracing operations are as follows:

The rider 37 drops in the low surface 98, of the cam 28, closing the contact 39, and current flows from one side of the rectifier 102 (the other side of the rectifier is attached through a lead 103 to ground) through a lead 104, a lead 105, the contact 39, a lead 106 and three leads 107 which are parallelly connected to one side of three impulse counter "clear" solenoids 108, 109 and 110. The three "clear" solenoids 108, 109 and 110 are parts of three impulse counters, 111, 112, and 113, 111 for counting units, 112 for counting tens, and 113 for counting hundreds, respectively. Current then flows through three parallel leads 114 from the solenoids 108, 109 and 110 to a common lead 115 and a lead 116 to ground. Energization of the three solenoids 108, 109 and 110 withdraws their latches from behind the teeth 117 cut in the peripheries of the hubs of three sectors 118 of the impulse counters 111, 112 and 113 permitting these sectors to be spring returned to the zero position shown in Fig. XIII.

The tracer bar 41 has in the meantime been moving downwardly driven by the action of the intermittent gear 29 and the rack 40. The brake 43 has been released by the pin 42, thus holding the disk 10 against further movement. The pin 53 has been moved through the inclined portion of the slot 54 and the three tracers 72, 78 and 79 swung downwardly into contact with the surface of the disk 10.

The three tracers 72, 78 and 79 are moved downwardly across the surface of the disk 10. In Fig. VIII the starting positions of the tracer contacts are shown in solid lines for the two values 899+ and 929—. The contact surfaces on the disk 10 are cross-hatched. The vertical straight lines drawn across the figure represent the radial lines on the disk corresponding to the particular values of the various steps of the contacts 19, 20 and 18. The horizontal broken lines indicate the time at which the counting impulses occur.

The impulses which operate the three impulse counters 111, 112, and 113 are all originated by the opening and closing of the contact 38 caused by rotation of the cam 28 which passes its short raised surfaces 99 beneath the cam rider 37. The creation of these impulses occurs at the same time during each tracing cycle and the number of the impulses which are applied to each of the impulse counters depends upon the time at which the particular counter is inserted into the electrical circuit receiving the impulses. This time of insertion is controlled by the engagement of the tracer contacts 72, 78 and 79 with the two series of contacts 16 and 17 and the contact 18 respectively. The tracing cycle differs slightly, depending upon whether the units tracer 72 contacts one of the individual contacts 21 which it does when the units value is between 8½ and 9½. This can be seen by reference to Fig. VIII where the individual contacts 21 are shown as extending horizontally on each side of the "9" radius a distance equal to half of the distance between successive ones of the radii.

If we assume that the value to be set up on the impulse counters is, for example, 784 (as shown in Fig. XIII), the operation of the device continues as follows: After the tracers have been brought into contact with the surface of the disk 10, the bar 41 continues to move downwardly and the three counters are "cleared" as above described by the closing of the contact 39. Immediately thereafter the rider 37 rides up on the first high surface 99 of the cam 28. In the example, none of the three tracers 72, 78 or 79 has reached any of the contacts 19, 20 or 18 and, therefore, no circuits have been established through which any of the impulses caused by the closing of the contact 38 can be transmitted to the impulse counters. Therefore, the first impulse, which occurs at the time that the tracer contacts are in the positions designated in Fig. VIII by the horizontal lines leading to "9," "90" and "900," is not applied to any of the impulse counters. The tracers continue to move downwardly and the tens tracer 78 comes into contact with the step (in that one of the contacts 20 which is positioned in line with it) corresponding to the value of "80." This closes a circuit from the rectifier 102 through a lead 119, the coil of a tens relay 120, a lead 121, the tracer contact 78, the contact 20 and the body of the disk 10 itself, and through a lead 122 to ground. This energizes the relay 120 and closes its normally open contacts 123 and 124. Closing of the contact 123 seals in the relay 120 by permitting the current to flow directly from the lead 121, through the contact 123, a lead 125 and the lead 116 to ground. Closing of the contact 124 establishes a circuit from ground through the lead 116, the lead 125, the contact 124, a lead 126 and a lead 127 to the counting solenoid 128 of the tens impulse counter 112. The other side of the solenoid 128 is connected through a lead 129 and a lead 130 to one side of the contact 38. The other side of the contact 38, formed by the cam rider 37, is connected through the leads 105 and 104 to the center connection of the rectifier 102.

Immediately thereafter the second one of the high surfaces 99 passes beneath the rider 37, closing the contact 38 and the circuit just described. This energizes the solenoid 128 which pulls downwardly on its feeding pawl 131. The feeding pawl is engaged with one of the teeth 117 on the hub of the sector 118 of the tens impulse counter 112. This advances the sector one step and a latching pawl 132 engages behind the second one of the teeth 117.

Since in the example of Fig. XIII the value to be registered is "784," the hundreds tracer 79 now contacts the hundreds contact 18. This establishes a circuit from the lead 104, through the coil of a hundreds relay 133 and a lead 134 to the tracer contact 79 and through the hundreds contact 18 on the disk 10 and the body of the disk 10 to the lead 122 and ground. This closes two normally open contacts 135 and 136 of the relay 133. The contact 35 seals in the relay by directly connecting the ground through the contact 135, the lead 134 and the coil of the relay 133 to the lead 104 and the rectifier. Closing of the contact 136 establishes a circuit from ground through the lead 116, the contact 136, a lead 137, the coil of a counting solenoid 138 of the hundreds counter 113 and a lead 139 to the lead 130 and the contact 38 and thence the leads 105 and 104 to the rectifier 102.

As soon as this circuit has been established, the third one of the steps 99 on the cam 28 closes the contact 38 which, through the circuit just described (and through the circuit above described leading to the tens counter 112), energizes the counting solenoid 138 (and the solenoid 128) to pull downwardly on its feeding pawl 140 (and the pawl 131) advancing the sector 118 of the hundreds impulse counter 113 (and the sector 118 of the tens impulse counter 112). A latching pawl 141 of the impulse counter 113 engages back of one of the teeth 117 to hold the sector 118 in place (as does the latching pawl 132 of the tens counter 112).

As the cam 28 continues to turn, and the bar 41 continues to move downwardly, the three tracer contacts 72, 78 and 79 continue to slide over the surface of the disk 10. The raised surfaces 99 successively lift the rider 37, sending impulses through the two circuits already described, momentarily energizing the two solenoids 128 and 138 and advancing the impulse counters 112 and 113 respectively, one step with each impulse. The tracer 72 then engages with the "4" step of that one of the contacts 19 in line with the tracer. This energizes a units relay 142 by closing a circuit from the rectifier 102 through the lead 104, a lead 143, the coil of the relay 142, a lead 144, the tracer contact 72, the contact 19 and the body of the disk 10 to the lead 122 and ground. This closes two normally open contacts 145 and 146 of the relay 142. The contact 145 seals in the relay by connecting the lead 144 to the lead 116 through a lead 147 and the contact 146 closes a circuit from ground through the lead 116, the lead 147, the contact 146, a lead 148, the coil of a units counting solenoid 149 and a lead 150 to the lead 130, the contact 38 and thence the leads 105 and 104 to the rectifier 102. The next one of the impulses created when the next one of the surfaces 99 raises the rider 37 and closes the contact 38, thus energizes the units counting solenoid 149 as well as the tens counting solenoid 128 and the hundreds counting solenoid 138. The energization of the units counting solenoid 149 attracts its feeding pawl 151 and advances the sector 118 of the units impulse counter 111 one step, a latching pawl 152 of the counter engaging behind one of the teeth 117 to hold the counter in position.

The three remaining raised surfaces 99 successively pass beneath the rider 37, and the three impulses created thereby are delivered to all three of the impulse counters to advance them simultaneously, after which the hundreds impulse counter 113 has been advanced seven steps, the tens impulse counter 112 eight steps and the units counter 111 four steps to register the value "784."

Referring now to Figs. IX, X, XI and XII, the sector 118 of the tens impulse counter 112 is shown in elevation in Fig. IX. A segment gear 153 is secured to the sector 118 and is engaged with a pinion 154 journaled on a stud 155 secured to one of a pair of uprights 156 formed on a frame 157 on which the impulse counters 112, 111 and 113 (in that order) are mounted. As the sector 118 of the tens counter 112 is advanced by successive energizations of the counting solenoid 128, the pinion 154 is rotated in a counterclockwise direction. The pinion 154 is engaged with two similar pinions 158 and 159 which are journaled on an upper shaft 160 and a similar lower shaft 161, respectively, that are mounted in the uprights 156. The two pinions 158 and 159 have elongated sleeve-like hubs 162 and 163, on the other ends of which are mounted a tens drum 164 and a tens type drum 165.

The sector 118 of the units impulse counter 111 similarly carries a segment gear 166 which is engaged with a pinion 167 also journaled on the stud 155 and engaged with two pinions 168 and 169 which are journaled on the hubs 162 and 163 respectively of the pinions 158 and 159 respectively. The pinions 168 and 169 are secured to the hubs of a units indicating drum 170 and a units type-bearing drum 171, respectively, located adjacent the two tens drums 164 and 165. The sector 118 of the hundreds impulse counter 113 carries a segment gear 172 which is meshed with a pinion 173 journaled on a stud 174 secured in the other one of the uprights 156. The pinion 173 is in mesh with two pinions 175 and 176 which are journaled on the other ends of the shafts 160 and 161 from which are journaled the pinions 158 and 159. The pinions 175 and 176 are secured on sleeves 177 and 178 respectively, on the other ends of which are mounted a hundreds indicating drum 179 and a hundreds type drum 180 respectively.

Thus as the three impulse counters 111, 112 and 113 are advanced, the corresponding indicating drums 170, 164 and 179, and the corresponding type-bearing drums 171, 165 and 180 are also advanced. A section of each of the peripheries of the three indicating drums 170, 164 and 179 is visible through a windowed opening 181 in the upper forward wall of a housing 182 mounted on the frame 157. The indication afforded through the opening 181 is shown in Fig. XII for the value "520" at which the sectors 118 of the impulse counters are shown in Figs. IX and XI. A card guide 183 projects through the wall of the housing 182 beneath the location of the three type drums 171, 165 and 180 for the insertion of tickets or cards to receive a printed indication of the value traced. An ink bearing ribbon 184 is carried around the type bearing drums by a ribbon guide 185 and passes beneath the type bearing drums just above the card guide 183. An opening 186 in the card guide is located just beneath the position to which the type corresponding to the value being traced is moved by the type-bearing drums. A printing hammer 187 is hinged in an upright 188 to be swung upwardly through the opening 186 to press a card, or other impression-receiving medium, upwardly against the ribbon 184 and the type. The rear end of the hammer 187 is bifurcated and a short link 189 is resiliently and pivotally connected to a pin 190 which extends across between the bifurcations. The upper end of the link 189 is connected to a core rod 191 of a printing solenoid 192. A push button 193 (Fig. XII), mounted on the housing 182, is used for controlling the printing operation although the printing operation may be made automatic by mounting an additional cam rider which would be actuated by another surface cut on one of the cams.

After the three tracers have been moved all the way across their respective contacts and, through the circuits established thereby, the impulses created by the cam surface 99 and the rider 37 have been transmitted to the impulse counters to set up, in their indicating and printing drums, a value corresponding to the value traced by the device, the tracers reach the position shown by the dash lines designated as "end" in Fig. VIII and at this point the intermittent gear 29 ceases to drive the bar 41 downwardly. Therefore the bar and the tracer frame 47 are moved upwardly under the impetus of the spring 44 until they reach the upper limit of their stroke. The cam rider 30 then drops into its "home" position on the surface 101 of the cam 26 breaking the contact 32 and, as earlier described, de-energizing not only the motor circuits but also the tracer circuits.

The description so far presented is of the operation of the tracer mechanism when the value to be traced and set up is not "critical." As was earlier explained, "critical" values are those occurring when either the tens or hundreds tracers must differentiate between successive steps in the contacts 20 or 18 corresponding to successive tens or hundreds values being traced. In order to insure accurate results at such "critical" positions, the mechanism herein disclosed has been provided with a "retracting" device. If, for example, the value to be traced is 899+ but less than 899½, the three tracers are originally in the position shown by the heavy lines 72, 78 and 79 in Fig. VIII. As the cycle of operations is started the cams rotated, and the bar 41 moved downwardly to start the tracers moving across the surface of the disk 10, the three impulse counters 111, 112 and 113 are "cleared" by the closing of the contact 39 as above described. Immediately thereafter, the units tracer 72 contacts that one of the individual contacts 21 which is associated with that one of the units contacts 19 located on the line being traced. These contacts 21 serve the same purpose as the contacts 19, i. e., they close the circuit above described to energize the units relay 142 and prepare the circuit to the units impulse counter 111 for the operation of its counting solenoid 149. (The relay 142, as above described, seals itself in immediately upon being energized.) During the period of time in which the tracer contact 72 is engaged with the contact 21, the cam surface 97 of the cam 27 lifts the cam rider 35 closing the contact 36. This permits current to flow from the rectifier 102 through the lead 104, the contact 36 and a lead 194 to the coil of the clapper solenoid 71 and thence through a lead 195, the contact 146 of the units relay 142 (which has just been closed), the lead 147 and the lead 116 to ground. If the value being traced is not "critical," this circuit is not closed by the momentary closing of the contact 36 because the units relay 142 has not yet been energized and its contact 146 is not closed until the tracer 72 contacts either one of the contacts 21 or one of the contacts 19. Energization of the clapper solenoid 71 swings its clapper 70 which swings the bar 68 to remove the latch 63 from behind the ear 64 of the tracer slide 56. The spring 61 moves the tracer slide and thus the tens and hundreds tracers to the right (the position shown in dotted lines in Fig. VIII designated by the numerals 78a and 79a).

The retraction of the tracer bars moves them to the right a distance corresponding to a value of one increment and thus eliminates any possibility of their being drawn across the wrong steps of the contacts 20 and 19. Since the units relay 142 is sealed in as soon as it is first energized, the first one of the impulses created when the contact 38 is closed by the first of the high surfaces 99 of the cam 28 is fed through this relay to the units impulse counter 111 even though (as can be seen by the time and motion lines of Fig. VIII) the tracer 72 is not in contact with either the contact 21 or the contact 19 at the time the impulse occurs. Thus the units impulse counter receives all nine of the impulses created by the cam surfaces 99 and the contact 38. The vertical distance between the individual contacts 21 and their associated contacts 19 represents the time provided for the operations of retraction just described. Therefore, the tracers 78 and 79 are completely retracted before they engage their respective contacts.

The remaining parts of the cycle of operations are the same as above described with reference to the tracting of the value "784" with the impulses being switched to the tens and hundreds counters when their tracers contact their respective steps of the contacts 20 and 18. After the trace has been completed, and the bar 41 released to be moved upwardly, the engagement of the projecion 67 with the cam 66 on the rear of the slide 56 cams the slide 56 to the left and permits the latch 63 to engage the ear 64 holding the latch in this position.

If the value to be traced is, for example, 928½+, or any other value having a units value of more than 8½ but less than 9, the three tracers are originally in the position shown at the left side of Fig. VIII (designated by the solid lines numbered 72b, 78b and 79b). When the tracer 72 contacts that one of the individual contacts 21 located at the position of the value to be traced, the cycle follows the steps just described causing the tracers 78 and 79 to retract to the positions shown by the dotted lines at the left side of Fig. VIII (designated by the numerals 78c and 79c). This retraction would not be absolutely essential since the original tracer position (78b and 79b) are quite removed from the extremely critical "riser" between successive "20" and "30" steps of the tens contact 20 but the retract mechanism is so designed that it always operates if the tracer 72 contacts any one of the individual units contacts 21.

The contacts 21 thus serve not only as the '9" contacts of the stepped units contacts 19, but also as the means for controlling the selection at "critical" positions to prevent the erroneous tracing of a value 10, 100 or 110 increments too large.

The embodiment of the invention that has been disclosed may be modified to meet various requirements.

Having described my invention, I claim:

1. In a device for registering numerical values, in combination, a designation bearing member movable into position for examination, said member bearing a plurality of series of increment designating elements, there being sharply defined transition points between said elements, impulse transmitting mechanism, a plurality of element examining members movable relative to said designation bearing member for examining said elements and for controlling said impulse transmitting mechanism in accordance with the values designated thereby, portions of those said elements designating the smallest increments being first examined by corresponding element examining members at such transition points, and means responsive to such first examination for shifting the others of said element examining members away from such transition points, thereby preventing erroneous examination of higher increment elements.

2. In a device for registering numerical values, in combination, a member movable into a position for examination, said member bearing a plurality of series of value increment designating elements, there being sharply defined demarcations between successive increment designations, a plurality of examining members for examining such value designating elements, one of said elements in each of said series of elements being simultaneously examined, those of said elements representing minor increments having portions adjacent such demarcations which portions are examinable, in time, before the remaining portion of said minor increment elements and the others of said elements, mechanism operable during such examination of said portions of said minor increment elements for shifting the major increment element examining members away from said demarcations thereby to eliminate possibility of error resulting from examining higher incorrect elements, means for actuating a value registering mechanism and means operable by co-action of said examining members and said designating elements for connecting said actuating means to said value registering mechanism to cause said value registering mechanism to register values equal to the values designated by those of said elements examined.

3. In a device for registering values, in combination, a condition-responsive member, said member bearing a plurality of series of value increment designating elements, there being one of said series for each digit in the values to be registered, there being sharply defined demarcations between successive elements in each of said series, a plurality of examining members for examining such value designating elements, one of said elements in each of said series of elements being simultaneously examined, there being an examining member for each of said series of elements, each of said elements in that series of elements representing unit increments having a portion adjacent the demarcation between such element and the successively higher element which is examinable, in time, before the balance of such element and the others of said series of elements, means operable when a value lying within the range of such portion is examined for shifting those of said examining members associated with elements representing higher increments away from such demarcations, and means controlled by said examining members for actuating a value registering mechanism in accordance with the values represented by the elements examined.

4. In a device for registering the numerical values of conditions, in combination, a condition-responsive member, said member bearing a plurality of stepped contacts arranged in separate series, there being one of said series for each division in the values to be registered, said contacts and their steps extending in one direction distances proportional to the values they represent, a plurality of sensing means, one of said sensing means being associated with each of said series of stepped contacts, said sensing means being movable transversely to such direction of extension of said contacts, the transition points between successive ones of said steps and successive ones of said contacts being sharply defined, the ultimate steps of each of said contacts which represent the smallest division of the values to be registered extending further in such transverse direction from the penultimate one of said steps than the remaining ones of said steps extend from those steps there adjacent, whereby, when the value to be sensed is smaller by not more than one and one-half nor less than one-half of the value of one of such smallest divisions of value than the value represented by one of said transition points between steps or contacts of those series of contacts representing higher divisions of values, said ultimate step is first sensed by the associated one of said sensing means, mechanism actuated upon sensing of such ultimate step for retracting the others of said sensing means and thus preventing incorrect sensing of higher divisions of values and mechanism controlled by and upon sensing by each of said sensing means of its associated contacts for registering the value of the contact sensed.

5. In a value sensing device, in combination, an element bearing a plurality of series of stepped increment designations, there being one of said series of increment designations for each digit in the values to be sensed, a plurality of sensing members, one for each of said series of increment designations, mechanism for moving said sensing members into sensing relation with said increment designations, means for creating a timed series of electrical inpulses during such movement of said sensing members for operating a series of electrically operated impulse counters one for each of said series of increment designations, each of said sensing members entering sensing relation with a step in one of its associated increment designations at a time during such series of electrical impulses when the remaining ones of such impulses equal the value of the sensed one of said steps, and mechanism energized upon such entrance for applying such remaining impulses to that one of said impulse counters connected to that series of increment designations in which such sensed step is located.

6. In a value sensing device, in combination, an element bearing a plurality of series of stepped increment designations, there being one of said series of increment designations for each digit in the values to be sensed, a plurality of sensing members, one for each of said series of increment designations, means for moving said element into position to be sensed, mechanism for moving said sensing members into contact with those of such steps in their associated increment designations representing a value to be sensed, means for creating a timed series of electrical impulses during such movement of said sensing members for operating a series of electrically operated impulse counters one for each of said series of element designations, each of said sensing members being moved into contact with such step at a time during the creation of such impulses when the remaining ones of such impulses equal the value of the sensed one of said steps and mechanism energized upon contact between such sensing member and such step for applying such remaining impulses to that one of said impulse counters connected to that series of increment designations in which such contacted step is located.

7. In a device for registering numerical values, in combination, a member bearing a plurality of stepped increment designating contacts, there being one series of stepped contacts for each order of increments of the values to be registered, the steps in each of said series of contacts being of lengths having a ratio equal to the ratio between the values of the orders of increments of value represented by said series, each of such steps having a height proportional to the number of such increments represented by said step, the ultimate one of such steps in each of said contacts representing the lowest order of increments having a height greater than the remaining ones of such steps, a sensing member associated with each of said series of contacts, means for controlling a value registering mechanism initiated by contact between each of said sensing members and its associated contacts for registering the value of that one of said steps in said contacts contacted, and mechanism for shifting those sensing members associated with said series of contacts representing higher orders of increments of value upon contact between the associated one of said sensing members and any one of said ultimate steps of those of said contacts representing the lowest increments of value, said shifting mechanism operating to move the shifted sensing members a distance equal to one of such lowest increments of value below their normal position thereby to prevent erroneous contacting of steps in those of said series of contacts associated therewith representing numbers of higher increments of value just higher than those equal to the true value to be registered.

8. In a device for registering the value of a condition under measurement, in combination, a condition-responsive member, said condition-responsive member bearing a plurality of series of stepped contact elements, one of said series representing unit increments of value, one of said series representing tens increments of value and a third of said series representing hundreds increments of value, the steps in said contacts being of lengths proportional to the values represented thereby and of heights proportional to the number of such values represented thereby, a plurality of contacting members movable into contact with said elements, said steps extending upwardly in the direction from which said contacting members are movable, those steps in said unit contact elements representing nines having a height greater than others of said steps, value registering mechanisms for registering the values of those steps contacted and mechanism operable upon contact of the associated contacting member with one of such nine steps of said unit contact elements for moving the others of said contacting members away from critical positions at the lines of demarcation between successive steps in said tens series of stepped contact elements and in said hundreds series of stepped contact elements, whereby erroneous registration of tens and hundreds values is prevented.

9. In a device for registering the numerical value of a condition by sensing the position of a condition-responsive member bearing a plurality of series of stepped increment-of-value designating contacts, in combination, an elongated ninth step on each of said contacts representing units, a plurality of sensing members movable into contact with said contacts, that one of said sensing members associated with said series of contacts representing units contacting said ninth steps before the others of said sensing members contact their respective contacts when the value being sensed lies within one-half a unit of any value having a unit value of nine, mechanism controlled by and at such first contact of said ninth steps and said units sensing member for shifting the others of said sensing members out of line with the adjacent demarcation lines between successive ones of those contacts and steps associated therewith and electrical means responsive to contact between said contacts and said sensing members for energizing a registering mechanism to indicate the values of those of said steps contacted.

10. In a device for registering the numerical value of a condition by sensing the position of a condition-responsive member bearing a plurality of series of stepped increment-of-value designating contacts, in combination, an elongated ninth step on each of said contacts representing units, a plurality of sensing members movable into contact with said contacts, that one of said sensing members associated with said series of contacts representing units contacting said ninth steps before the others of said sensing members contact their respective contacts when the value being sensed lies within one-half a unit of any value having a unit value of nine, mechanism controlled by and at such first contact of said ninth steps and said units sensing member for shifting the others of said sensing members out of line with the adjacent demarcation lines between successive ones of those contacts and steps associated therewith, electrical apparatus for creating a timed series of electrical impulses during the movement of said sensing members subsequent to the operation of said shifting mechanism, other electrical apparatus activated upon first contact of any of said sensing members with one of the steps in that series of contacts associated therewith for selecting the remaining ones of such electrical impulses, said timed series of electrical impulses being adapted to operate impulse counters to which the selected ones of such impulses are applied for registering the value of the contacted ones of said steps.

11. In a device for registering the numerical value of a condition by sensing the position of a condition-responsive member bearing a plurality of series of stepped increment-of-value designating electrical contacts, in combination, a plurality of tracers movable across said contacts, one series of said contacts representing unit increments, said contacts representing units having a ninth step so constructed as to be contacted by its associated tracer before the others of said contacts are contacted by their associated tracers when the value to be registered lies within one-half unit of a value having a unit value of nine, electrical mechanism for creating a timed series of nine impulses during the movement of said tracers across said contacts subsequent to the time at which one of such ninth steps is contacted if the value being traced lies within the compass thereof, electrical apparatus adapted to energize an electrical impulse counter associated with each said series of contacts for applying to each of said impulse counters those of such electrical impulses not yet created at the time of contact between the associated series of contacts and its tracer, and other mechanism operable upon contact between any one of such ninth steps and its associated tracer for shifting the others of said tracers, before the start of the creation of such electrical impulses, out of line with the lines of demarcation between successive steps or contacts in said series of contacts representing higher increments of value.

12. In a device for registering the numerical value of a condition by sensing the position of a condition-responsive member bearing a plurality of series of stepped increment-of-value designating electrical contacts, in combination, a plurality of tracers movable across said contacts, electrical mechanism for creating a timed series of nine electrical impulses during the movement of said tracers across said contacts, said series of electrical impulses being adapted to energize an electrical impulse counter associated with each of said series of contacts, and electrical apparatus for applying to each of said counters those of said electrical impulses not yet created at the time of contact between the associated one of said tracers and the contacted one of the steps in one of its associated contacts.

13. In a printing scale, in combination, a condition-responsive disk bearing a plurality of series of stepped increment designating elements, one of said series being provided for each order of increments in the values to be printed, the steps in each of said elements being proportional in length to the value of the increments represented thereby and in height to the number of such increments represented thereby, those of said elements in said series of elements representing the lowest increments of value having an ultimate step higher than any others of the steps in any of said elements, an individual sensing member movable into contact with the steps in said elements in each of said series of elements, one of such ultimate steps being contacted by the associated one of said sensing members before any of the others of said steps in any of said series of elements are contacted when the value to be sensed and printed lies within one-half of the lowest increment of value of the value represented by such ultimate step, the others of said sensing members being then in line with demarcations between successive steps or successive elements in the others of said series of elements, mechanism operable upon such first contact by its associated sensing member with such ultimate step for shifting the others of said sensing members out of line with such demarcations, and electrical means for actuating a recording mechanism associated with each of said sensing members for recording the value of that one of said steps in that series of elements contacted by such sensing member.

14. In a printing scale, in combination, a condition-responsive disk bearing a plurality of series of stepped increment designating contacts, one of said series being provided for each order of increments in the values to be printed, the steps in each of said contacts being proportional in length to the value of the increments represented thereby and in height to the number of such increments represented thereby, those of said contacts in said series of contacts representing the lowest increments of value having an ultimate step higher than any others of the steps in any of said contacts, an individual tracer movable into contact with and across the steps in said contacts in each of said series of contacts, one of such ultimate steps being contacted by the associated one of said tracers before any of the others of said steps in any of said series of contacts are contacted by their associated tracers, when the value to be printed is such that those tracers associated with series of contacts representing higher increments of value are in line with demarcations between successive steps or successive contacts in such higher increment series of contacts, shiftable mechanism operable upon such contact between one of such ultimate steps and its associated tracer for shifting the others of said tracers out of line with such demarcations, electrical apparatus for creating a timed series of electrical impulses during the movement of said tracers, and mechanism activated upon contact of each of said tracers with one of its associated contacts for applying the remaining ones of said timed series of electrical impulses, to an electrically operated impulse counter corresponding to each of said tracers such remaining ones of such impulses being equal in number to the numerical value of whatever one of said steps is contacted, to that one of said impulse counters associated with that one of said tracers in question.

LAWRENCE S. WILLIAMS.